United States Patent [19]
Beam et al.

[11] 3,797,022
[45] Mar. 12, 1974

[54] APPARATUS AND METHOD FOR REPRODUCTION OF CHARACTER MATRICES INK JET PRINTER USING READ ONLY MEMORY

[75] Inventors: Dale Rickard Beam, Dayton; Edward Raymond Thomas, Kettering, both of Ohio

[73] Assignee: The Mead Corporation, Dayton, Ohio

[22] Filed: July 25, 1972

[21] Appl. No.: 274,894

[52] U.S. Cl. ............... 346/75, 178/30, 340/173 SP, 340/324 AD
[51] Int. Cl. ........................................ G01d 15/18
[58] Field of Search......................... 346/75; 178/30; 340/173 SP, 324 AD

[56] References Cited

UNITED STATES PATENTS 3,373,437 3/1968 Sweet et al. .......................... 346/75
3,503,063 3/1970 Starr ........................... 340/324 AD
3,560,641 2/1971 Taylor et al. ..................... 346/75 X
3,624,661 11/1971 Shebanow et al. .............. 346/74 ES

*Primary Examiner*—Joseph W. Hartary
*Attorney, Agent, or Firm*—Biebel, French & Bugg

[57] ABSTRACT

ON/OFF character printing apparatus and a memory device therefor includes a print head with spaced rows of ON/OFF marking elements for placing marks in predetermined cells within a character matrix. A mark receiving web is transported in mark receiving relation to the print head and is printed with selected characters. Delay inherent in movement of the web from one row of marking elements to another is compensated by appropriate programming of read only memory are so interconnected that sequential activation of the input lines produces parallel outputs with the required relative delays.

1 Claim, 5 Drawing Figures

APPARATUS AND METHOD FOR REPRODUCTION OF CHARACTER MATRICES INK JET PRINTER USING READ ONLY MEMORY

BACKGROUND OF THE INVENTION

This invention relates to the field of character printing and has particular utility in combination with recorders employing rows of ON/OFF modulated marking devices. Examples of such recorders are disclosed in Williamson U.S. Pat. No. 2,779,654 and Taylor et al, U.S. Pat. No. 3,560,641. Recorders of this type cannot print characters as such, but rather, must construct the characters by filling in elemental cells within the character matrices.

A number of techniques are available for generation of the marking signals required in connection with such matrix printing. One especially attractive method involves the use of read only memories. These memories can be programmed to define a character matrix, and will deliver parallel print/no-print information on a set of output lines in response to a series of pulses on a set of input lines. A set of such character matrices for use with a single row of marking elements is shown, for instance, in Sweet et al, U.S. Pat. No. 3,373,437.

As described in detail in the above-mentioned Taylor patent, special considerations arise when printing with multiple rows of marking elements. In particular, information fed to successive rows of elements must be relatively delayed, and the print receiving member driven at an appropriate speed for production of print registration in the finished copy. This means that the multiple row recorder cannot be used in combination with conventional character memories as shown for instance in the above-mentioned Sweet patent, unless provision is made for imposition of appropriate delays on the memory output lines. It will be appreciated that such delays may be quite costly in terms of requirements for increased numbers of logic components.

SUMMARY OF THE INVENTION

This invention enables efficient utilization of a plural row jet drop recording apparatus or other plural row ON/OFF marker as a character printer, by storing and retrieving the characters in a novel manner. In accordance with this invention a set of characters are stored in a ready only memory, but with character columns displaced in correspondence with anticipated delays in the actual printing operation. Thus the individual character sections within the memory may be activated, and the signals output therefrom transmitted directly to appropriate marking elements without imposition of any delays. Activation of the individual memory sections may be accomplished by use of compact character codes of the type read out by a general purpose digital computer. Accordingly the system can function as a high speed, on-line computer output printer.

DESCRIPTION OF THE PREFERRED EMBODIMENTS

Figure 1:
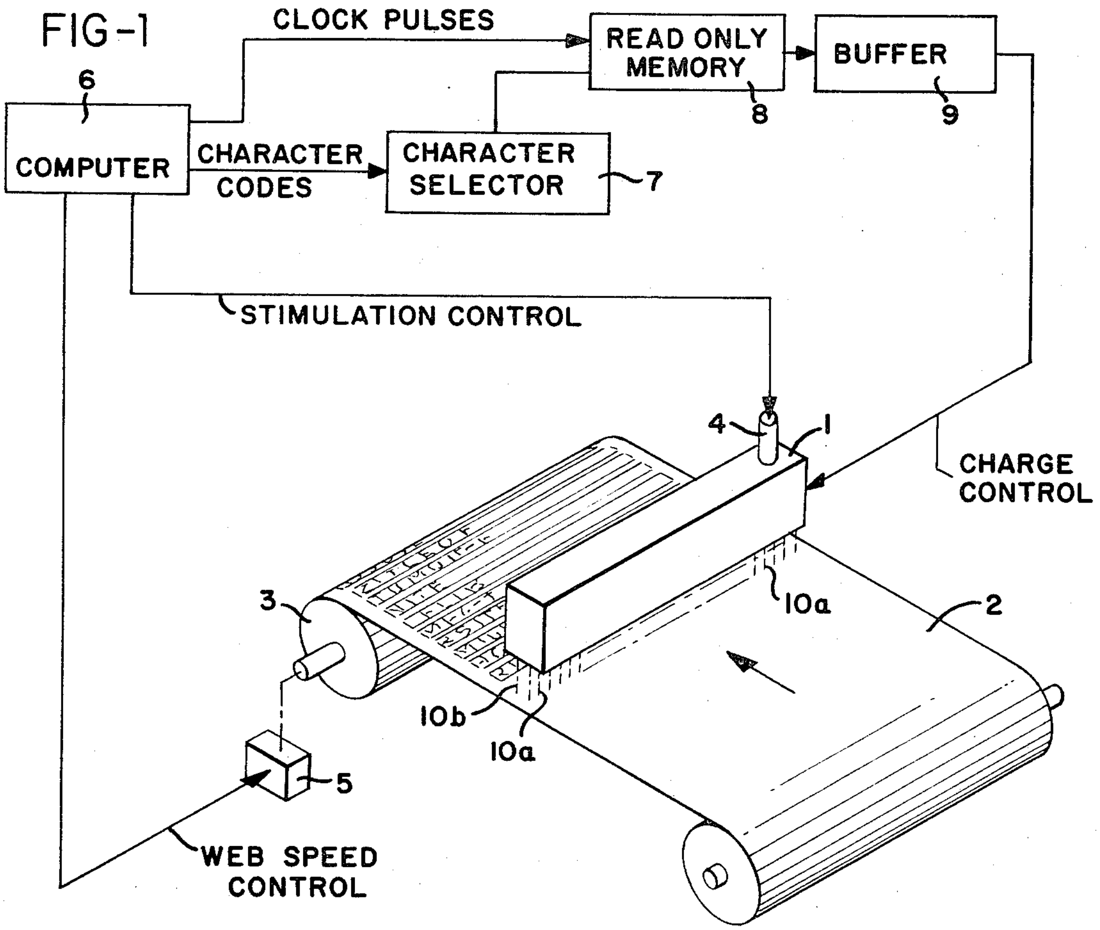
FIG. 1 is a general block diagram of a character printing system utilizing this invention.

FIG. 1 illustrates a typical application of this invention wherein a twin row jet drop printing head is being operated as a character printer. Print head 1 projects two rows of jets and may be constructed generally as described in copending U.S. application Ser. No. 189,298, filed Oct. 14, 1971, now U.S. Pat. No. 3,701,998, and assigned to the assignee of this application. A web of paper 2 is driven by roll 3 to pass under print head 1 and receive printed information by the action on jets 10 arranged in two rows 10*a* and 10*b*. Jets 10 each comprise a series of uniformly sized and regularly spaced drops which may be selectively deposited or caught as hereinafter described.

A computer 6 generates a continuous string of character codes which are transmitted to character selector 7. Computer 6 also generates a stimulation control signal for transmission to stimulator 4, a web speed control signal for transmission to gear box 5 and a clock signal for read only memory 8. The stimulation control and the web speed controls signals may be generated independently of computer 6, but it is desirable that these signals be synchronized with the generation of the character code signal. As further shown in FIG. 1, the output of character selector 7 is fed to a read only memory 8 which operates buffer 9 to produce charge control signals for use by a series of charge rings mounted within print head 1.

Figure 2:
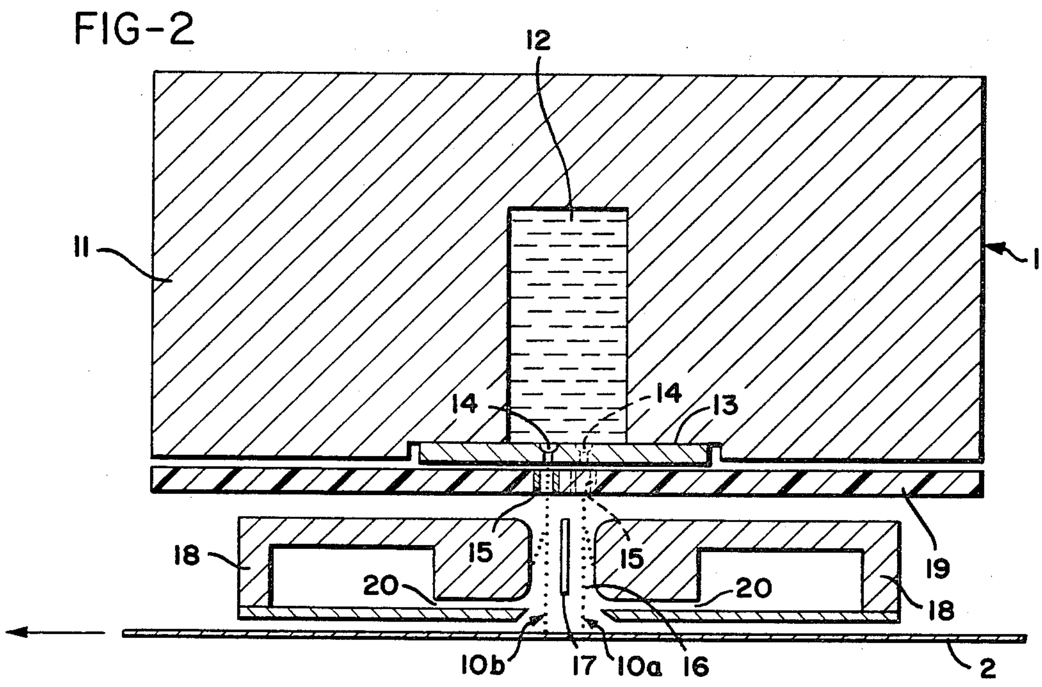
FIG. 2 is a cross sectional illustration of a twin row jet drop printing apparatus adapted for use in combination with character storage and retrieval apparatus made in accordance with this invention.

The general construction of print head 1 is illustrated in FIG. 2. As shown therein a supply of ink 12 is maintained within a manifold 11 for delivery to orifices 14 in orifice plate 13. Orifice plate 13 is caused to vibrate by the action of stimulator 4 (FIG. 1). Printing fluid 12 exits from orifices 14 in streams 10*a* and 10*b* each comprising a series of uniformly sized and regularly spaced drops 16. A series of conductive charge rings 15 in a non-conductive charge ring plate 19 surround drop streams 10*a* and 10*b* near the point of drop formation. Application of a charge to any of charge rings 15 causes inductive charging of drops formed within that charge ring during the charging period. Each charge ring 15 is connected to buffer 9. Drops 16 are therefore charged or not in correspondence with charge control signals transmitted by buffer 9.

A deflection plate 17 runs the length of print head 1 between drop streams 10*a* and 10*b*. Deflection plate 17 is charged to set up a pair of steady state electrical deflection fields reaching over catchers 18. Any drops which carry an electrical charge are deflected by one of these deflection fields to impinge upon the face of one of catchers 18. Drops which strike catchers 18 run down on the faces thereof and are injested into channels 20 by the action of a vacuum pump (not shown). Drops which are uncharged pass undeflected through the aforementioned field and strike web 2.

It will be appreciated that streams 10*a* are staggered with respect to streams 10*b* so that collectively streams 10*a* and 10*b* can produce solid printing coverage of web 2. It will be further appreciated that charge rings in the two charge ring rows must be switched in time domains which are separated by a period equal to the time required for the web 2 to travel from the location of streams of 10*a* to the location of streams 10*b*. This can be understood by considering a condition wherein no drops are being charged so that all drops deposit on the moving web. If the web speed is properly adjusted as taught in the above-mentioned Taylor et al patent, then the falling drops will produce solid printing coverage. Now then, if a short duration charge signal is applied simultaneously to all charge rings, a staggered white line will appear across the printed area. In order to produce a straight non-staggered white line across the printed area, it is necessary that the charge rings controlling streams 10*b* be given their short duration charge shortly after the charging of the charge rings controlling streams 10*a*.

Figure 3:
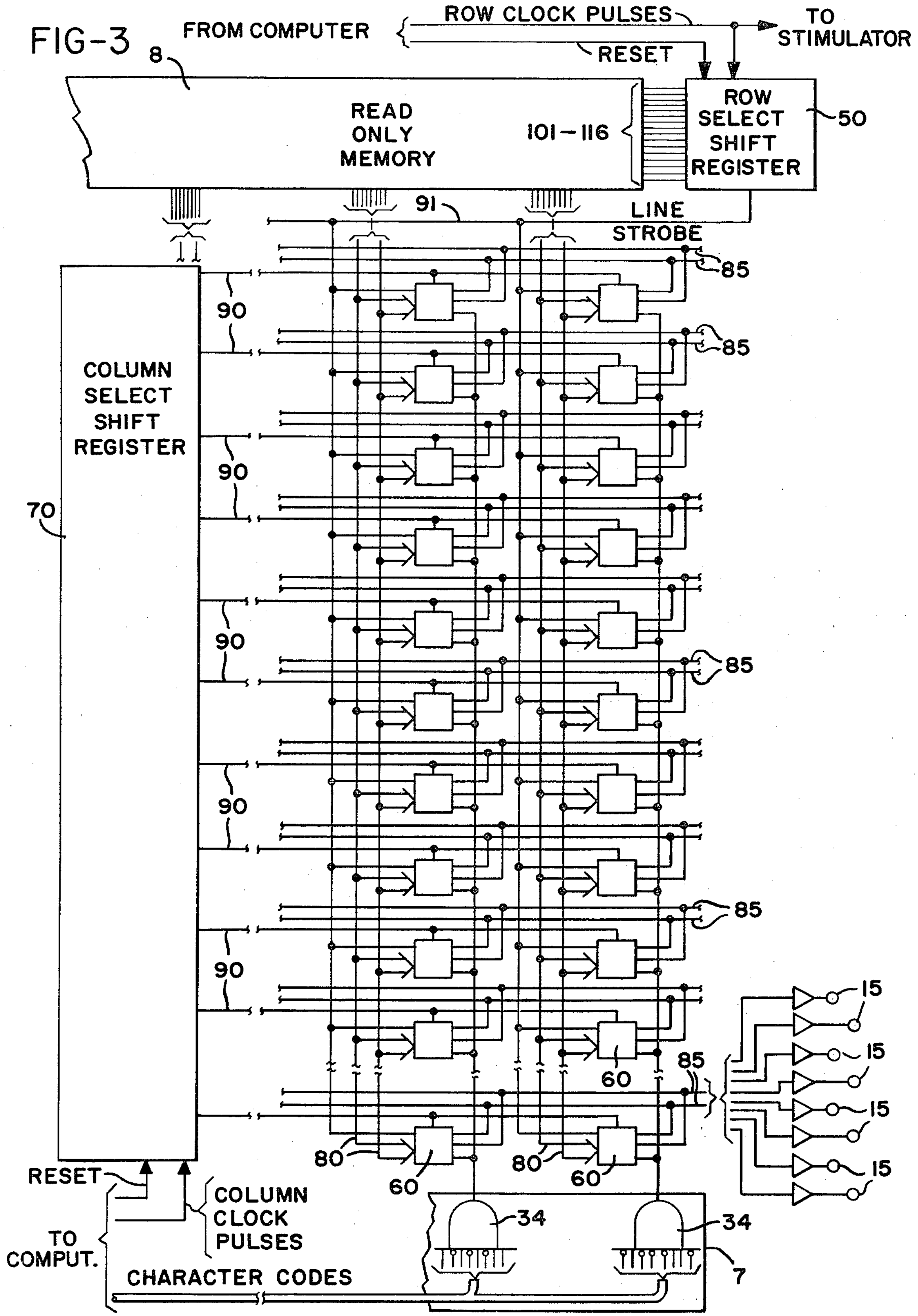
FIG. 3 is a block diagram of one embodiment of the invention.

FIG. 3 illustrates the general organization of one embodiment of a system employing this invention. Read only memory 8 as shown in FIG. 3 may comprise a series of memory matrices 30 as shown more particularly in FIG. 4. Typically read only memory 8 may comprise 256 such memory matrices all sharing sixteen common input lines 101 through 116. Each of the 256 memory matrices has eight output lines 80, and each set of output lines 80 may feed 132 steering circuits 60 (33,792 total steering circuits). Steering circuits 60 in turn provide control signals to charge rings 15 via lines 85. Each steering circuit 60 is connected to eight lines 85 and each line 85 is connected to 256 steering circuits 60. Signals on lines 85 pass through a series of inverters such as inverters 71 through 78 (FIG. 4) prior to arrival at charge rings 15. Charge rings 15 are grouped into sets of eight; each set being adapted to print one column of characters, and each set being controlled by 256 steering circuits 60 to print the output from any one of 256 character matrices within read only memory 8. There are 1,056 charge rings 15 (132 sets of eight).

Row select shift register 50 provides a series of sequential pulses on lines 101 through 116. And also a line strobe on line 91. The line strobe goes to all of steering circuits 60 and occurs just prior to the pulses on line 101. Column select shift register 70 provides a series of sequential select strobes to lines 90 which connect steering circuits 60 as shown. There are 132 such lines 90 and each connects 260 steering circuits. Computer 6 provides row clock pulses to row select shift register 50 and column clock pulses to column select shift register 70. The column select pulses are generated at a higher frequency than the line select pulses so that one hunderd thirty two column clock pulses may occur during the time required for 16 row clock pulses. Computer 6 also generates reset signals for row select shift register 50 and column select shift register 70 and character codes for character gates 34. Character gates 34 in turn provide enabling signals for steering circuits 60 as shown in FIG. 3.

Figure 4:
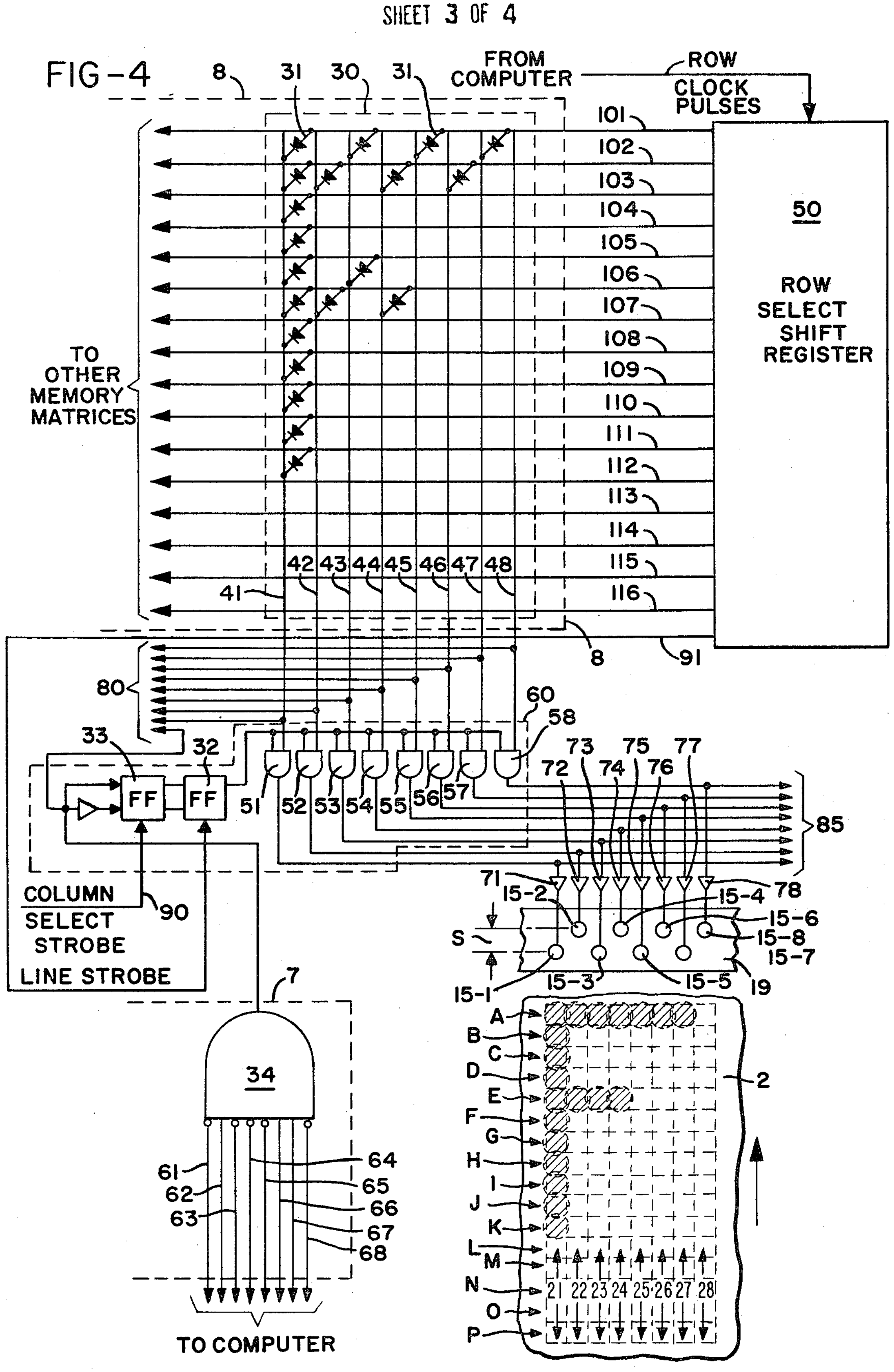
FIG. 4 is a schematic diagram of a portion of the embodiment of FIG. 3.

The operation of the system of FIG. 4 may be understood by reference to the schematic diagram of FIG. 4 wherein are illustrated one steering circuit 60, one character gate 34, eight charge rings 15-1 through 15-8 and one memory matrix 30 within read only memory 8. The circuitry illustrated therein is configured to print the upper case letter "F" on web 2.

Referring now to FIG. 4 there is shown a portion of web 2 with phantom lines defining an 8 by 16 character matrix within which a character will be printed. The particular matrix cells which will be filled in with ink deposits are designated by shading. The character matrix consists of eight columns, 21 through 28, and 16 rows, A through P. For purposes of further discussion any matrix cell will be referred to by its column and row. Thus the cell defining the end of the middle stroke of the letter "F" is to be known as cell 24E.

As further shown on FIG. 4 the above described area on web 2 is about to pass under the printing influence of a portion of charge ring plate 19. Eight charge rings 15 - 1 through 15 - 8 are in alignment with columns 21 through 28 respectively. Any desired number of drops may be deposited in any matrix cell, but for this explanation, operation on a one-drop-per-cell basis will be assumed. This means that for a cell length $s$ and a drop stimulation frequency $f$, the velocity $v$ of web 2 is adjusted such that $v = sf$.

Now assume that the separation distance between the charge ring rows is also equal to $s$. This means that when charge ring 15 - 1 is uncharged for deposition of a drop in cell 21B, charge ring 15 - 2 is uncharged (or charged) for deposition of a drop in (or catching of a drop for) matrix cell 22A. Thus charge ring 15 - 2 must switch in a time domain which is delayed for a period $s/v$ with respect to the time domain of charge ring 15 - 1.

Pulses for interruption of charge at charge rings 15 - 1 through 15 - 8 are generated by row select shift register 50 and pass over lines 101 through 116 to memory matrices 30. One such memory matrix for printing the upper case letter "F" is illustrated in FIG. 4. All of the memory matrices generate printing control signals continuously, and steering circuits 60 determine which memory matrix output will be printed and which set of jets will do the printing.

Clock pulses for control of row select shift register 50 originate in computer 6 and are transmitted to stimulator 4 as well as to row select shift register 50. This results in the placement of one drop of ink in each illustrated character cell. The frequency of row selection and drop placement may be typically about 50KH$_z$. For placement of several drops in each character cell, stimulator 4 may be driven at a frequency which is a harmonic of the row clock frequency.

Memory matrix 30 has input lines and output lines 101–116 and 41–48 respectively and comprises a series of diodes 31, each connected as shown. Lines 41–48 are branches of lines 80 discussed above with reference to FIG. 3. Thus a pulse on line 101 produces a simultaneous set of pulses on lines 41, 43, 45 and 47. Lines 42 and 44, and 46 receive no pulse until activation of line 102 which occurs one drop repetition period after the activation of line 101.

Lines 41 through 48 are connected respectively to AND gates 51 through 58 as shown. AND gates 51 through 58 are connected respectively to inverters 71 through 78 which feed charge rings 15 - 1 to 15 - 8. AND gates 51 through 58 are all enabled by a high output from flip flop 32. Flip flop 32 is set by a high output from flip flop 33. Flip flop 33 is set by an output from AND gate 34. Inverters 71 through 78 are inserted ahead of charge rings 15 - 1 through 15 - 8 because the jet drop marking channel requires a "0" for PRINT and a "1" for NO PRINT.

AND gate 34 is one of 256 similar AND gates within character selector 7. Eight lines 61 through 68 tie these AND gates to computer 6. Computer 6 specifies a series of characters by transmitting a series of eight bit words over lines 61 through 68. AND gate 34 is configured to respond to the digital word 01000110 which is the ASCII code for the upper case letter F. Each of the other character gates within character selector 7 respond to a different one of the two hundred fifty six possible eight bit codes. For each of the other character gates there is also a memory matrix corresponding to memory matrix 30.

Flip flops 32 and 33 and AND gates 51 through 58 collectively define one steering circuit 60. As explained with reference to FIG. 3 above, this steering circuit is connected in common with 255 other such steering circuits to eight lines 85. These lines 85 supply control signals to charge rings 15 - 1 through 15 - 8 so that the associated jets may print any one of 256 different characters. There are 131 other sets of similarly connected charge rings and steering circuits whereby web 2 may be printed with 132 columns of information.

Each time a new digital word appears on lines 61 through 68 there is a column select strobe generated on one of lines 90 so that 256 associated flip flops 33 are enabled for setting by outputs from corresponding character gates 34. Only one character gate 34 will respond to the digital word, however, and therefore only one of the 33,792 steering circuits 60 is conditioned for passage of print control signals from read only memory 8 to an associated set of charge rings 15.

For the example illustrated in FIG. 4, the upper case letter "F" is to be printed by eight jets under the control of eight charge rings designated 15 - 1 through 15 - 8. This printing will occur upon the appearance of the word 01000110 on line 61 through 68, but only if a column select strobe is also applied to flip flop 33 before the word terminates. In any event, the appearance of 01000110 on lines 61 through 68 will result in the setting of one of 132 flip flops connected to character gate 34, the selection of a particular flip flop being determined by the strobing sequence. Setting of flip flop 33 puts a HI output out of flip flop 32 but not until generation of a line select strobe. A line strobe is generated at the beginning of each new row select shift cycle. Thus printing of all 132 character columns can commence simultaneously, and base line alignment is achieved.

When the output of flip flop 32 goes HI, then AND gates 51 through 58 are enabled as above stated. Accordingly a pulse on line 101 will result in parallel pulses on lines 41, 43, 45, and 47 and interruption of charge on charge ring 15 - 1, 15 - 3, 15 - 5, and 15 - 7. This will result in printing of character matrix cells 21A, 23A, 25A, and 27A. One drop stimulation period later a pulse on line 102 will produce parallel output pulses on lines 41, 42, 44 and 46. This will result of printing of character matrix cells 21B, 22A, 25A, and 26A. Thus it is seen that the printing of cells of 22A, 24A and 26A is delayed until web 2 is in position under charge rings 15 - 2, 15 - 4 and 15 - 6 for marking. Printing of character matrix cells 22E and 24E is similarly delayed with respect to the printing of cells 21E and 23E. Delays for desired times longer than one row clock period may be achieved by changing the connection of those diodes 31 which supply pulses to lines 42, 44, and 46. Thus the printing of character matrix cell 24E could be delayed three row clock periods with respect to the printing of cell 23E by eliminating the diode connection between lines 106 and 44 and substituting therefor a diode connection between lines 108 and 44.

Figure 5:
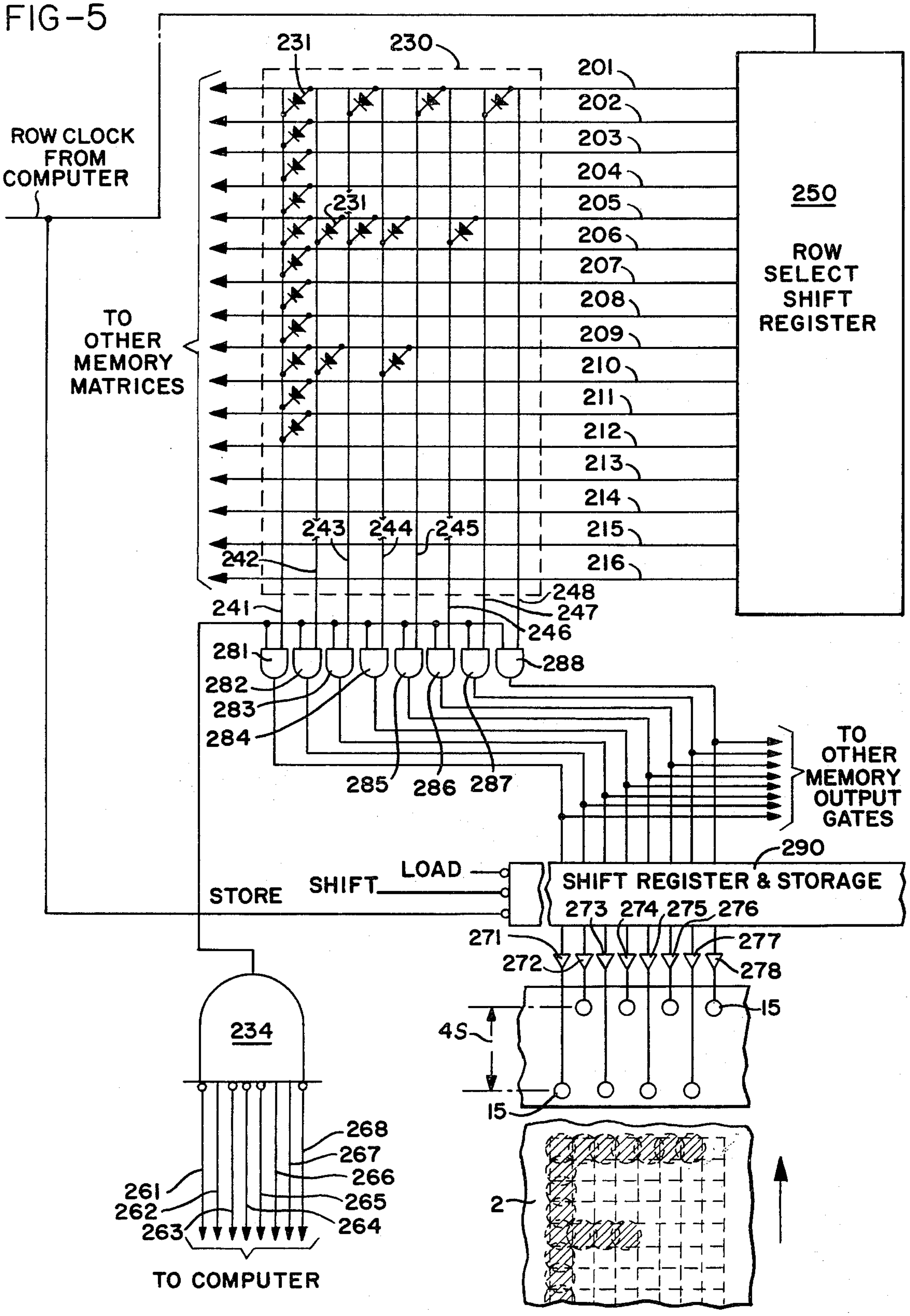
FIG. 5 is a schematic diagram of a portion of an alternative embodiment of this invention.

FIG. 5 shows an alternative embodiment for delaying the streams 10*b* with respect to streams 10*a*. In this embodiment the output of character gate 234 controls a shift and storage register 290 instead of a set of flip flops such as flip flops 32 and 33 of FIG. 3. To further illustrate the information delay feature of this invention, the rear row of charge rings (i.e., those charge rings controlling the streams 10*b*) are displaced from the front row of charge rings a distance 4S. The speed of web 2 is the same as for the first above-mentioned embodiment, and therefore a relative front to back row delay of four row clock periods must be achieved.

The implementation of the alternative embodiment is similar to that of the first mentioned embodiment, and differs mainly in that the register 290 replaces the 33,792 steering circuits 60. AND gates 281 through 288 function similarly to AND gates 51 through 58 but in the alternative embodiment only 256 such sets of AND gates are required to print 256 characters.

As further shown on FIG. 5, a row clock signal from computer 6 drives row select shift register 250. Lines 201 through 216 act as output lines from row select shift register 250 and input lines for memory matrix 230. Diodes 231 carry pulses from lines 201 through 216 to memory matrix output lines 241 through 248. Lines 261 through 268 carry eight bit character codes from computer 6 to character gate 234. AND gates 281 through 288 are enabled by concurrent pulses from character gate 234 and lines 241 through 248. Output pulses from AND gates 281 through 288 are fed to register 290. Computer 6 provides LOAD and SHIFT signals to enable loading of eight-bit bytes of printing information from a designated memory matrix 230 into register 290. Register 290 is shifted until 132 eight-bit bytes have been loaded. The information so loaded is then stored for delivery to inverters 271 through 278 and charge rings 15 - 1 through 15 - 8. Storage is carried out in synchronism with the row clock pulses.

It will be appreciated that the signals on lines 261 through 268 must have a different format than the corresponding signals on lines 61 to 68 of the embodiment of FIG. 3. That is, character codes on lines 261 through 268 are maintained for only one row clock period. After one hundred thirty two character codes have been transmitted to character gate 234, the same one hundred thirty two character codes must be repeated. This process is repeated 16 times before a new string of 132 character codes may be generated on lines 61 through 68. Thus the embodiment of FIG. 3 effectively stores 132 complete characters, whereas the embodiment of FIG. 4 stores only one row from each of 132 characters. The required delay for rear stream switching is accomplished by diode connection of output lines 242, 244 and 246 to input lines which are activated four row clock periods later than the input lines to which connection would be made for no delay.

It will be readily apparent that the diodes illustrated for connection of the above described memory matrices may be replaced by other readily available devices. For instance, many currently available read only memories are programmed by appropriate activation of MOS field effect transistors. Capacitive type read only memories are also available.

While the systems herein described constitute preferred embodiments of the invention, it is to be understood that the invention is now limited to these particular embodiments and that changes may be made without departing from the scope of the invention.

What is claimed is:

1. In an ink jet recorder of the type wherein two spaced rows of laterally staggered ink jets are stimulated to produce streams of uniformly sized and regularly spaced drops, and said drops are selectively charged for deflection and catching to produce printed matrices corresponding to characters selected from a set thereof, apparatus for controlling said matrix printing comprising:

a read only memory organized into sections corresponding to said characters, each section thereof being directly connected to input lines greater in number than the number of rows of said matrices and to output lines equal in number to the number of columns of said matrices, means for organizing laterally consecutive jets into a plurality of groups with each group membership corresponding in number to the number of output lines from one of said memory sections, switching means for placing each of said groups into communication with the output lines from any one of said sections, means for sequential activation of the input lines of any of said memory sections, means within each of said sections for connection of the section input lines to some of the section output lines whereby said sequential activation of the input lines of any of said memory sections communicates to charging means for jets within one row of a communicating jet group a set of parallel information signals corresponding to marking information in corresponding columns of the corresponding character matrix, other means within each of said sections for connection of the section input lines with other of the section output lines whereby said sequential activation of said section input lines communicates to charging means for jets within the other row of said communicating jet group another set of parallel information signals corresponding to marking information in other columns of the corresponding character matrix; said other set of parallel information signals being delayed with respect to the first aforesaid set of parallel signals an amount of time corresponding to the spacing between said other row of jets and the first aforesaid row of jets, a register connected to each of said memory sections and organized for bytewise receipt of said parallel information signals, shifting of bytes so received in synchronism with said sequential activation, and temporary storage of one marking control signal for each jet in said recorder, and means to transport a mark receiving member past said drop streams at a speed whereby the sets of parallel signals communicated to the charging means for said rows of jets produces deflection and catching of drops within said streams with row to row delays as required to reproduce said character matrix in correct registration.

* * * * *